United States Patent [19]
Manning et al.

[11] Patent Number: 5,831,511
[45] Date of Patent: Nov. 3, 1998

[54] RESISTANCE TEMPERATURE DETECTOR ASSEMBLY AND METHOD OF FABRICATING SAME

[75] Inventors: Michael Patrick Manning, Watervliet; James Oldham Lambert, Malta; Robert Timothy Lembke, Amsterdam, all of N.Y.; Celia Ann Dieterich, Medford, Mass.; Daniel R. Tommasone, Schenectady, N.Y.

[73] Assignee: General Electric Co., Schenectady, N.Y.

[21] Appl. No.: 680,308

[22] Filed: Jul. 11, 1996

[51] Int. Cl.⁶ ...................................................... H01C 3/04
[52] U.S. Cl. .................... 338/25; 338/23; 338/24; 338/26; 29/612
[58] Field of Search .................................. 338/23, 24, 25, 338/26; 374/152, 208; 29/612

[56] References Cited

U.S. PATENT DOCUMENTS

| | | | |
|---|---|---|---|
| 3,441,893 | 4/1969 | Gordon et al. | 338/26 |
| 3,701,281 | 10/1972 | Sogner | 73/362 |
| 3,760,319 | 9/1973 | Kawazoe | 338/26 |
| 3,852,570 | 12/1974 | Tyler | 338/212 |
| 4,188,553 | 2/1980 | Wheaton | 338/28 |
| 4,348,870 | 9/1982 | Stein et al. | 374/165 |
| 4,565,455 | 1/1986 | Bloore et al. | 338/25 |
| 4,878,039 | 10/1989 | Kraemer . | |
| 5,091,666 | 2/1992 | Jarczynski . | |
| 5,142,182 | 8/1992 | Grant . | |
| 5,201,223 | 4/1993 | McQueen . | |
| 5,329,197 | 7/1994 | Kudlacik . | |
| 5,367,282 | 11/1994 | Clem | 338/26 |
| 5,382,093 | 1/1995 | Dutcher | 374/204 |

FOREIGN PATENT DOCUMENTS 737805  5/1955  United Kingdom ..................... 338/26

*Primary Examiner*—Michael L. Gellner
*Assistant Examiner*—Karl Easthom
*Attorney, Agent, or Firm*—Nixon & Vanderhye

[57] ABSTRACT

A resistance temperature detector (RTD) unit includes an RTD assembly that is removably supported in a central chamber of a support assembly. In a preferred arrangement, the RTD assembly and the central chamber are arc shaped to facilitate removal from the support assembly and to maintain contact surface area. By providing a removable RTD assembly, costs are reduced over current RTD assemblies including two monitoring elements, and the RTD elements can be replaced without dismantling the top bar connections.

11 Claims, 2 Drawing Sheets

RESISTANCE TEMPERATURE DETECTOR ASSEMBLY AND METHOD OF FABRICATING SAME

TECHNICAL FIELD

The present invention relates to liquid-cooled generator stator bar temperature monitoring and, more particularly, to a resistance temperature detector assembly including a removable resistance temperature detector for liquid-cooled generator stator bar temperature monitoring.

BACKGROUND

Compact generator designs are achievable through the use of direct water cooling of the generator armature winding. These designs employ hollow copper strands through which deionized water flows. The cooling water is supplied via a closed-loop auxiliary-base-mounted skid. The cooled water enters the winding through a distribution header on the connection end of the generator and the warm water is discharged in a similar manner on the turbine end of the generator.

Liquid-cooled generator stator bar temperature is typically monitored by placing a single resistance temperature detector (RTD) assembly between the two bars in each slot. The RTD assembly consists of an RTD element that is wrapped in KAPTON® tape to protect the electrical connections. The taped element plus a certain length of lead wire connections are sandwiched between layers of glass cloth and impregnated with epoxy resin and cured to give it stiffness as a subassembly. The subassembly is then laid up in lamination of pre-cured glass and resin, which are cut to the width of the stator slot. The bottom pre-cured laminations are grooved to fit the subassembly. A top lamination is put in place to cover the groove and fixed in place with epoxy. The wires for electrical connection protrude from the side of the laminations so they can be fed out of the slot to the connection point.

The stator winding consists of coils placed in slots in the stator core. The stranded leads of the coils are brazed together to form phase groups or belts. Each phase winding is split into two belts. Connections between phase belts and to the six phase leads are made with stranded bus rings or cable.

A stator coil may be made up as a complete coil called a loop coil, or in two halves called bars. A loop coil has only two leads, which are located at the connections end of the stator frame. A bar coil will have the two coil leads at the connection end, and other pairs of leads at both ends for connection to form complete coils. The number of pairs of these additional leads will depend upon the number of turns of the coil.

Stator coils are designed with transpositions of the strands to reduce circulating currents in the strands, which result from unequal distribution of flux from top to bottom of the stator slot under load conditions. Transpositions of the strands from slot to slot are accomplished by twisting a coil lead through 180-degrees rotation. Transpositions of the strands within a slot are accomplished by the Roebel method, in which each strand is formed and mated with all others so that in the length of the slot each will pass through every portion of the area of the slot occupied by the coil side. Only one method is used for a stator winding.

The bars or coils are insulated with several layers of mica tape and impregnated with a thermosetting compound, which is applied at several different stages of the taping process. They are impregnated by first subjecting them to heat and vacuum in a large tank and then introducing the compound into the tank and forcing it into the turns under pressure; this process removes any moisture and eliminates any voids in the insulation. An outer covering of glass tape is applied to the insulated bar or coil to bind and protect the mica insulation, while an additional covering of tape is applied to the core portion for protection against abrasion by the steel punchings. They are then treated with oil-resistant varnish. When required to minimize the effect of corona, the oil-resistant varnish on the core portion is replaced with a conductive paint (containing graphite) extending beyond the core at each end.

The end turns of the armature windings are securely faced with treated glass cord to the binding bands, which are molded fiberglass rings supported from the armature end flanges. The armature coils are held in the slots by TEX-TOLITE® wedges driven into the dovetail slots.

Typically, RTD assemblies are located between each bar of the armature winding to measure the temperature of the winding at the point of highest normal temperature. Once the RTD assembly is in place, and the top stator bar is installed and wedged into place, the RTD assembly cannot be removed or even accessed without dismantling the top bar connections.

At times, the RTD assemblies do not function properly or at all, usually due to damage during stator winding or due to faulty elements. When this occurs, the RTD failure is not detected until system checks that occur after the stator core is completely wound. This requires removal of bars to gain access to the RTD assembly for repair or replacement.

To avoid having to replace faulty or damaged monitoring elements, the current RTD assemblies have two monitoring elements for redundancy. Although this has solved most problems during initial stator assembly, this solution significantly increases costs and does not address the replacing of RTD elements in the field.

DISCLOSURE OF THE INVENTION

It is therefore an object of the invention to provide an RTD assembly including a removable RTD element to replace the current fixed-in-place design for liquid-cooled generator stator bar temperature monitoring.

This and other objects and advantages of the invention are achieved by providing a resistance temperature detector (RTD) unit including an RTD assembly; and a support assembly including a central chamber delimiting an RTD support housing. The RTD assembly is removably disposed in the RTD support housing. In a preferred arrangement, the RTD assembly is arc shaped to facilitate removal from the support assembly and to maintain contact surface area. The RTD assembly preferably includes a wrapped RTD element and a stiffening unit surrounding the RTD element. In this regard, the stiffening unit may be comprised of layers of glass cloth disposed on opposite sides of the RTD element and impregnated with epoxy resin. The support assembly may comprise pre-cured glass and resin. The RTD element is preferably wrapped with KAPTON® tape.

In accordance with another aspect of the invention, there is provided a method of fabricating a resistance temperature detector (RTD) unit. The method includes the steps of (a) surrounding a wrapped RTD element with a stiffening unit; and (b) removably inserting the surrounded RTD element into a support assembly. Step (a) may be practiced by forming the surrounded RTD element in an arc shape.

BRIEF DESCRIPTION OF THE DRAWINGS

These and other aspects of the present invention will become apparent from the following detailed description of preferred embodiments when read in conjunction with the accompanying drawings, in which.

BEST MODE FOR CARRYING OUT THE INVENTION

Figure 1:
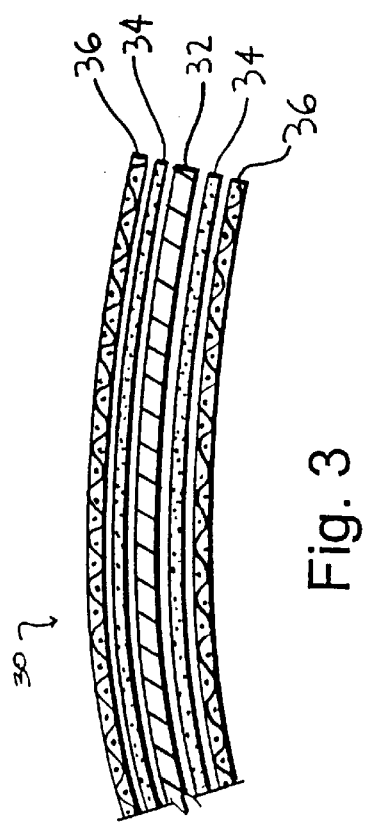
FIG. 1 illustrates a stator end winding section including an RTD assembly disposed between the top and bottom bar.

Referring now to the drawings, particularly to FIG. 1, there is illustrated a liquid-cooled stator winding arrangement used in a typical liquid-cooled generator. A stator core 10 having stator core flanges 12 and key-shaped bars 14 is illustrated, with stator bars 16a, 16b passing through radially extending slots (described below) in the stator core 10 and terminating at opposite ends in inlet and outlet end fittings (inlet end fitting shown at 18). The end fitting 18 is formed of an electrically conductive material such as copper.

Figure 2:
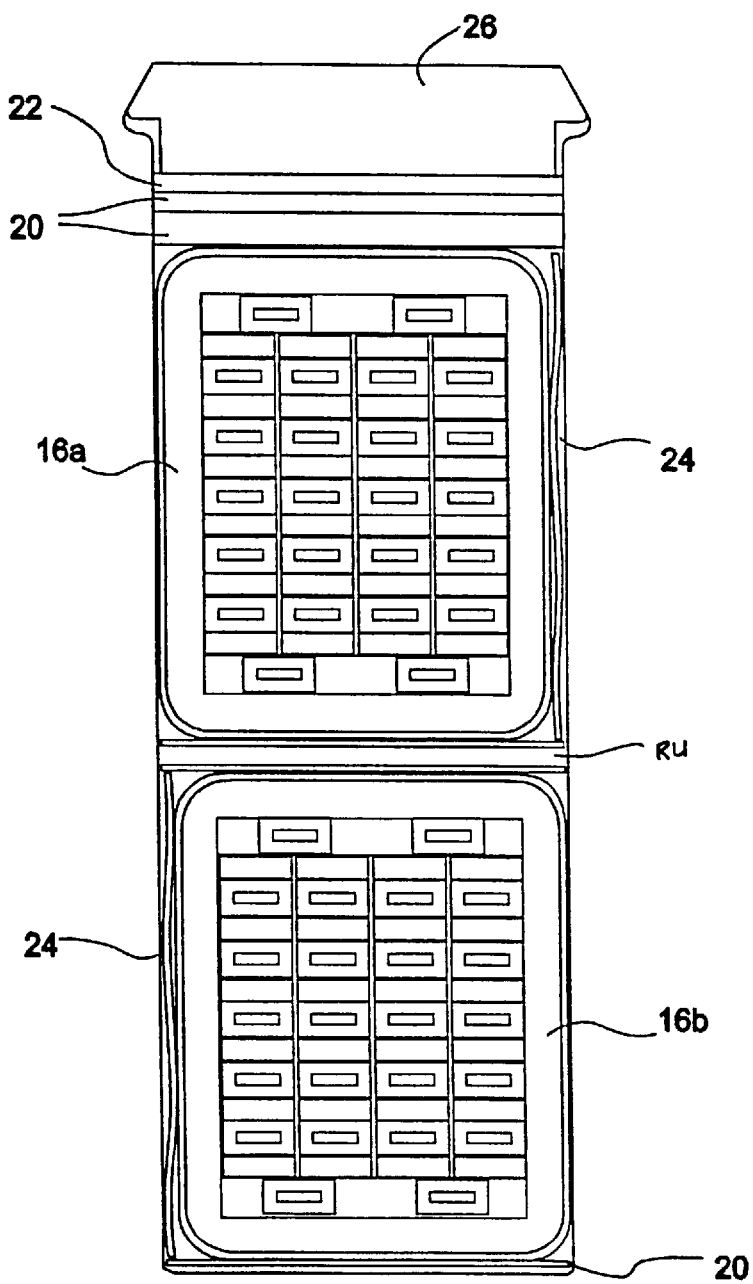
FIG. 2 illustrates a stator slot cross section.

FIG. 2 is a cross-sectional view of a liquid-cooled stator slot assembly. The stator slot assembly houses a top bar 16a and a bottom bar 16b. The bars are secured in the slots with fillers 20 and top-ripple springs 22 to restrain the bars radially, and with side-ripple springs 24 to increase friction between the bar and the slot wall. The side-ripple springs 24 are also conducting to ensure proper grounding of the bar surface. The side-ripple springs further provide permanent friction damping against tangential and radial motion. A top of slot radial force wedge 26 is designed to securely hold the armature bars down to the bottom of the slot, preventing potential destructive bar motion. The slot is further configured to enable freedom for axial movement to accommodate thermal expansion without component stress.

Figure 3:
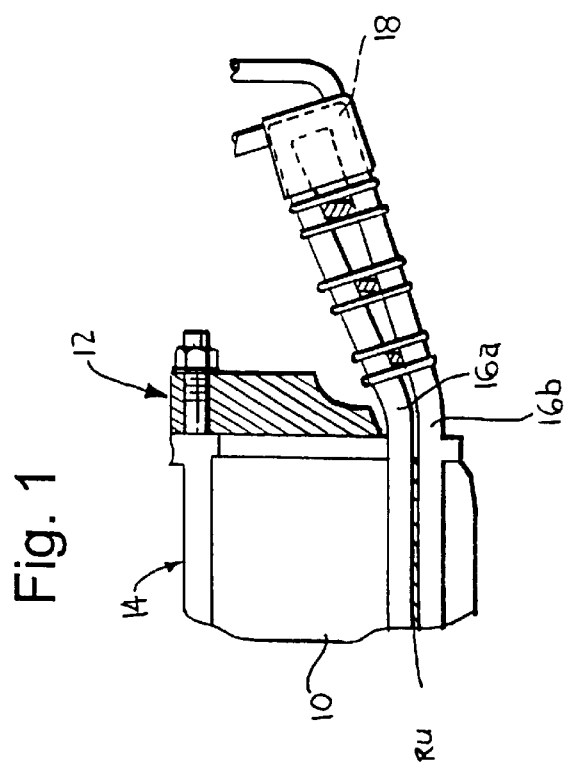
FIG. 3 is an exploded cross-sectional view of the RTD assembly according to the present invention.
Figure 4:
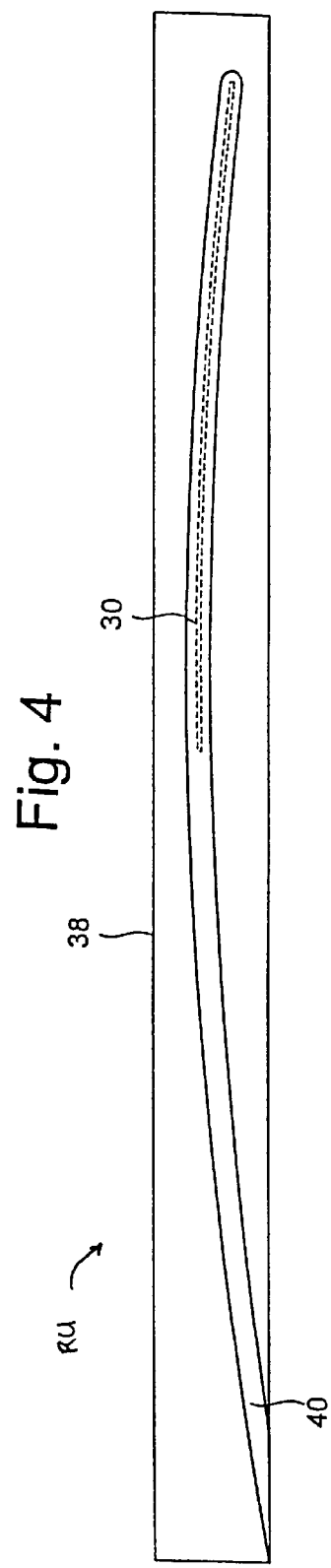
FIG. 4 illustrates the RTD unit according to the present invention.

Between the two bars 16a, 16b in the slot, liquid-cooled generator stator bar temperature is monitored using a resistance temperature detector (RTD) unit RU. Referring to FIG. 3 and 4, the RTD unit RU according to the present invention is fabricated having a width and thickness that is the same as a conventional RTD assembly so that the unit fits in the slot the same as the current design. In addition, similar to the conventional RTD assembly, the RTD unit according to the invention includes an RTD assembly 30 having an RTD element 32 that is wrapped in KAPTON® tape 34 to protect the electrical connections. The taped elements plus a certain length of lead wire connections are sandwiched between layers of glass cloth 36 impregnated with epoxy resin and cured for stiffness.

Referring to FIG. 4, the RTD unit RU includes a pre-cured glass and resin support assembly 38 having an arc shaped central chamber 40 delimiting an RTD support housing. The RTD assembly 30 is correspondingly arc shaped for ease of removal and for maintaining contact surface area. That is, the arc shape facilitates manipulation of the RTD assembly 30 to avoid contact with other stator components during removal. Moreover, the arc shape helps to ensure that the RTD assembly 30 is disposed at a preferred position within the support assembly 38, i.e., at a peak of the arc. The arc shaped RTD element is secured in the central chamber 40 by friction and prevented from inadvertent removal by tape or a silicon plug or the like (not shown).

In order to replace faulty or damaged monitoring elements with the RTD unit according to the present invention, an operator need merely remove the RTD assembly from the central chamber 40 and insert a new RTD assembly, without requiring dismantling of the top bar connections.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A resistance temperature detector (RTD) unit disposed in a space between a top bar and a bottom bar of a liquid-cooled stator slot assembly, comprising:

an RTD assembly; and a support assembly disposed in the space between the top bar and the bottom bar of the liquid-cooled stator slot assembly, said support assembly including a central chamber delimiting an RTD support housing, wherein said RTD assembly is removably disposed in said RTD support housing such that said RTD assembly can be readily withdrawn from said central chamber while said support assembly remains disposed in said space without damaging said RTD assembly.

2. An RTD unit according to claim 1, wherein said RTD assembly is arc shaped to facilitate removal from said support assembly and to maintain contact surface area.

3. An RTD unit according to claim 2, wherein said RTD assembly comprises a wrapped RTD element and a stiffening unit surrounding said RTD element.

4. An RTD unit according to claim 3, wherein said stiffening unit comprises layers of glass cloth disposed on opposite sides of said RTD element and impregnated with epoxy resin.

5. An RTD unit according to claim 3, wherein said support assembly comprises pre-cured glass and resin.

6. An RTD unit according to claim 1, wherein said RTD assembly comprises a wrapped RTD element and a stiffening unit surrounding said RTD element.

7. An RTD unit according to claim 6, wherein said stiffening unit comprises layers of glass cloth disposed on opposite sides of said RTD element and impregnated with epoxy resin.

8. An RTD unit according to claim 6, wherein said RTD element is wrapped with a predetermined type of tape.

9. An RTD unit according to claim 1, wherein said support assembly comprises pre-cured glass and resin.

10. A method of fabricating a resistance temperature detector (RTD) unit for a liquid-cooled stator slot assembly, the method comprising;

(a) surrounding a wrapped RTD element with a stiffening unit; and (b) removably inserting the wrapped RTD element into a support assembly having a central chamber delimiting an RTD support housing, and disposing the support assembly in a space between a top bar and a bottom bar of the liquid-cooled stator slot assembly such that the RTD element can be readily withdrawn from the central chamber while the support assembly remains disposed in the space without damaging the RTD element.

11. A method according to claim 10, wherein step (a) is practiced by forming the surrounded RTD element in an arc shape.

* * * * *